March 2, 1948. J. J. SLOMER 2,437,213
TROLLEY POLE POSITIONING MEANS
Filed Nov. 13, 1944 2 Sheets-Sheet 1
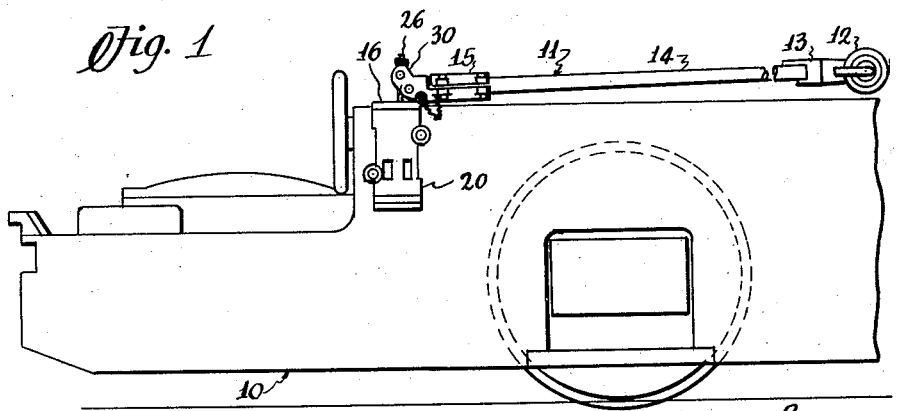
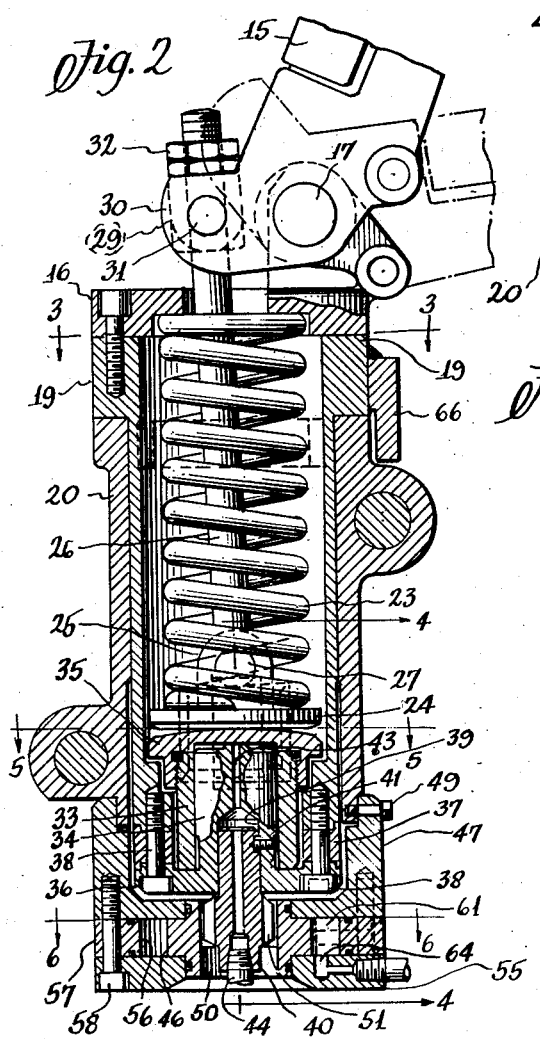
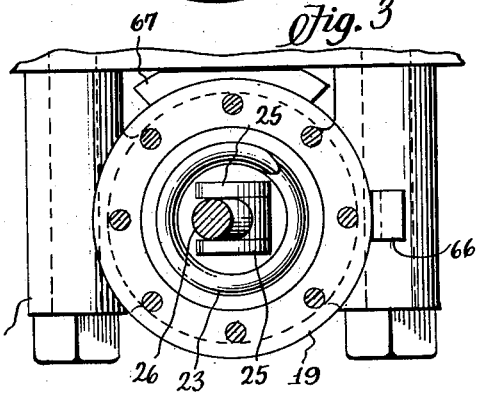
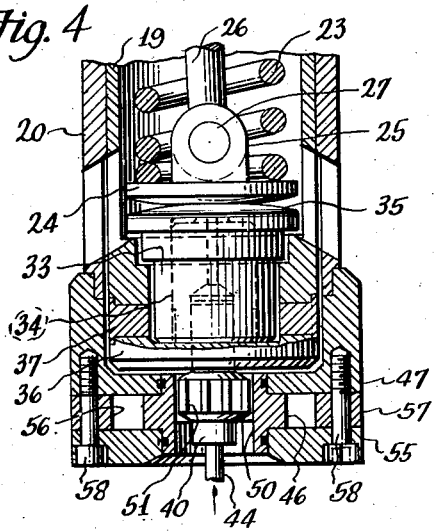
INVENTOR
Joseph J. Slomer
Clarence T. Poole
ATTORNEY March 2, 1948.  J. J. SLOMER  2,437,213
TROLLEY POLE POSITIONING MEANS
Filed Nov. 13, 1944  2 Sheets-Sheet 2

INVENTOR
Joseph J. Slomer
Clarence F. Poole
ATTORNEY

Patented Mar. 2, 1948

2,437,213

UNITED STATES PATENT OFFICE 2,437,213

TROLLEY POLE POSITIONING MEANS

Joseph J. Slomer, Chicago, Ill., assignor to Goodman Manufacturing Company, Chicago, Ill., a corporation of Illinois Application November 13, 1944, Serial No. 563,175

1 Claim. (Cl. 191—70)

This invention relates to improvements in trolley poles and has as its principal objects to provide an improved form of self-retrieving trolley pole particularly adapted for use on mine locomotives underground.

In carrying out my invention I provide a new and improved form of mounting for a trolley pole wherein the current collector or trolley wheel is held in engagement with the trolley wire by spring operated means, and wherein a fluid operated means controllable by the operator of the locomotive is provided to instantaneously lower the trolley pole, to prevent breakage of the trolley pole by engagement with the mine roof, when the trolley wheel jumps its trolley wire. I also provide a means to turn the trolley pole in its socket so the current collector may be positioned to engage the trolley wire without the use of the hand, making it unnecessary for the operator to leave the cab of the locomotive to replace the trolley wheel on the trolley wire.

These and other objects of my invention will appear from time to time as the following specification proceeds and with reference to the accompanying drawings wherein:

Figure 1 is a fragmentary view in side elevation of the control end of a mine locomotive;

Figure 2 is an enlarged view in longitudinal section taken through the trolley pole supporting means;

Figure 3 is a sectional view taken substantially along line 3—3 of Figure 2;

Figure 4 is a fragmentary sectional view taken substantially along line 4—4 of Figure 2;

Figure 5:
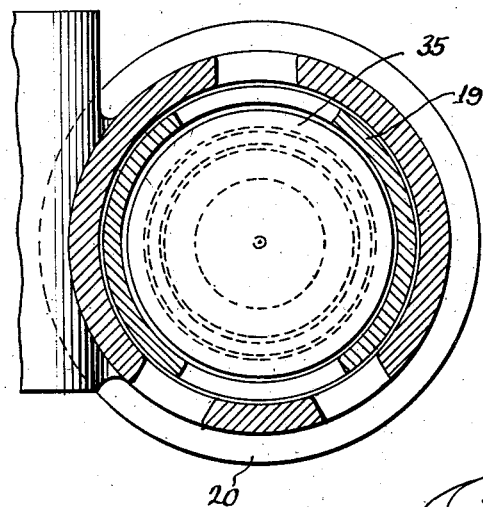
Figure 5 is an enlarged fragmentary sectional view taken substantially along line 5—5 of Figure 2.
Figure 6:
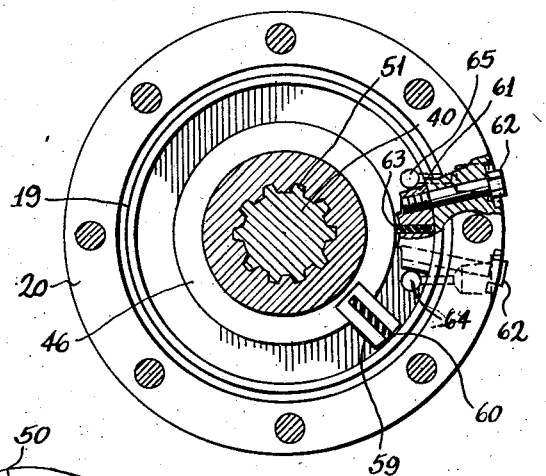
Figure 6 is a fragmentary sectional view drawn to substantially the same scale as Figure 5 and taken substantially along line 6—6 of Figure 2.
Figure 7:
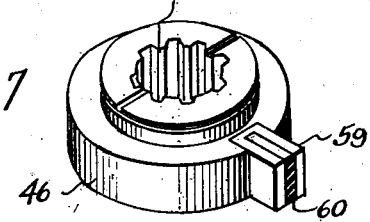
Figure 8:
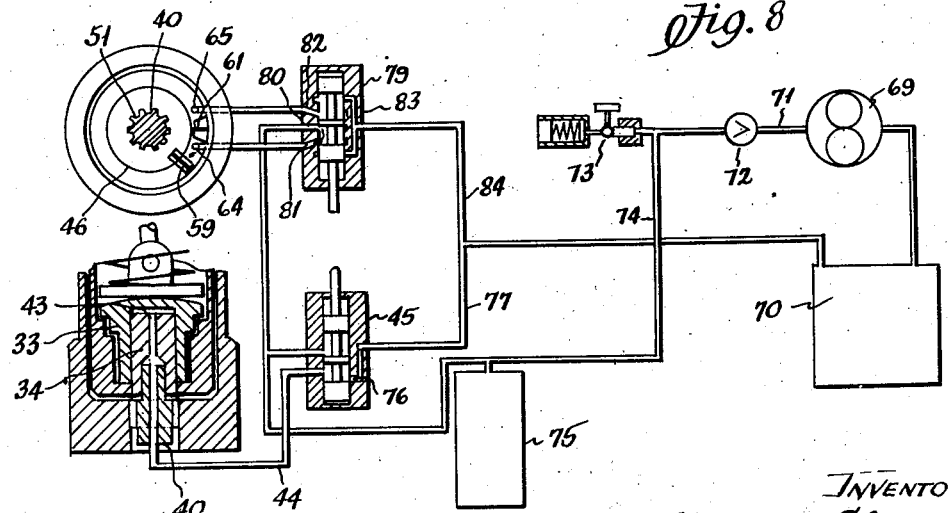

Figure 7 is an enlarged isometric view of the rotor for turning the trolley pole by power, to properly locate the trolley pole so it may be replaced to collect current from the trolley wire; and Figure 8 is a diagrammatic view showing the diagram of the fluid system for supplying fluid under pressure to the means for lowering the trolley pole and the means for turning the trolley pole to locate the trolley wheel for replacement on the trolley wire.

Referring now to the drawings the invention is herein preferably shown as being applied to a mine locomotive 10 having a trolley pole indicated generally by reference character 11, which serves to supply power to the locomotive. Said locomotive may be of any well known type, driven by suitable electric motors (not shown), and is only herein shown to illustrate one manner in which the device of my invention may be applied.

The trolley pole 11 includes a current collector, herein shown as being a trolley wheel 12 which is adapted to engage the trolley wire to collect current therefrom. Said trolley wheel is rotatably mounted on a trolley harp 13, which is mounted on the outer end of a pole 14. Said pole is mounted in a trolley pole support 15 which is transversely pivoted to a trolley pole base 16 on a transverse pivotal pin 17.

The base 16 is herein shown as being a circular plate apertured at its center, which is secured to the upper end of a cylindrical support member 19. Said cylindrical support member extends within a socket 20 which may be secured to a side plate of the locomotive 10. Said support member is shouldered at its upper end and the shouldered portion thereof abuts the annular upper side of said socket, to limit downward movement of said support member with respect to said socket and to mount said support member within said socket for pivotal movement about a vertical axis.

The cylindrical support member 19 serves to enclose a compression spring 23 which abuts the underside of the base 16 at its upper end and which serves to urge the trolley pole 11 in an upward direction, to hold the trolley wheel 12 in engagement with the trolley wire during operation of the locomotive. The lower end of said spring engages the upper side of an abutment member 24, which has a pair of spaced upright ears 25, which extend along opposite sides of and are pivotally connected to the eye of an eyebolt 26 by means of a pivotal pin 27. Said eyebolt extends through said spring and through a block 29, which is trunnioned to an arm 30 of the trolley pole support 15 by means of trunnion pins 31, 31. Lock nuts 32, 32 are threaded on the upper end of said rod and abut the upper side of said block 29, to hold said block on said eyebolt and to adjust the tension of the spring 23.

Referring now to the novel feature of my invention whereby the trolley pole may be instantaneously lowered by the operator of the locomotive, when the wheel 12 jumps the trolley wire, to reduce breakage of the pole and dangerous conditions which may result when the pole hits the mine roof and supporting beams therefor, a fluid cylinder 33 is mounted for movement along a piston 34. The upper end of said cylinder is closed by an abutment member 35, herein shown as being threaded thereon. Said abutment member has engagement with the underside of the abutment member 24, to move said abutment member 24 and the eyebolt 26 against the spring 23. The piston 34 has a flanged lower portion 36 which abuts the lower end of an annular ring 37, and which is secured to the bottom of the cylindrical support 19 by means of cap screws 38, 38 extending through said flange and ring and threaded in the lower end of said support.

The piston 34 is drilled along its center as indicated by reference character 39, to receive a hollow shaft 40. The fit between said shaft and the inside of said piston is a pressed fit, and said shaft is further secured to said piston by means of a set screw 41. Said piston is provided with a passageway 43, in alignment with the hollow center of said hollow shaft, which connects the drill 39 with the inside of the abutment member 35 and the cylinder 33. A fluid conduit 44 connects a fluid valve 45 with the lower end of said hollow shaft (see Figure 8), to admit fluid under pressure through the center of said hollow shaft and the passageway 43, to cause the abutment member 35 and the cylinder 33 to move along the piston 34 and to move the abutment member 24 and eyebolt 26 against the compression spring 23, to positively pivot the trolley pole in a downward direction about the pin 17, through the block 29, trunnioned to the lever arm 30.

The trolley pole 11 is turned in the socket 20 by means of a rotor 46, rotatably mounted in a casing 47. Said casing abuts the lower end of said socket and extends upwardly along the outer cylindrical sides of said socket a short distance, and is secured thereto by means of machine screws 49, 49. Said rotor is provided with a hollow central splined portion 50 coaxial with the center of the hollow shaft 40, the splines of which are adapted to engage splines 51, 51 extending outwardly from said shaft, so that turning movement of said rotor will cause turning movement of said shaft and the cylindrical support 19.

The rotor 46 is shouldered at its opposite ends and the upper shouldered portion of said rotor is journaled in the upper end of the casing 47. The lower shouldered portion of said rotor is journaled in a plate 55 forming the lower end of said casing (see Figure 2). An annular space is provided between the outer periphery of said rotor and an inner cylindrical wall 56 of said casing, which wall is formed by the inner periphery of an annular ring 57 forming a spacing member to space the plate 55 beneath the upper inner surface of said casing a distance equal to the thickness of said rotor. Machine screws 58, 58 are provided to secure the parts of said casing together. A radial vane 59 extends outwardly from said rotor into said space. Said vane is slotted in the direction of its length and has a radially extending packing member 60 mounted in the slotted portion thereof. Said packing member engages the inner cylindrical wall 56 and the upper and lower inner sides of said casing, to form a fluid-tight connection therebetween.

A member 61 is secured to the inside of the cylindrical wall 56 by machine screws 62, 62 and extends inwardly towards the rotor 46. Said member is slotted at its central portion and has a radially extending packing member 63 mounted therein, which engages the outside of the rotor 46 and the upper and lower sides of the inside of the casing 47, to prevent the passage of fluid thereby. A fluid passageway 64 is formed in the lower end plate 55 and opens into the space between said rotor and the inner cylindrical wall of said casing. Another fluid passageway 65 opens into said casing from the end plate 55 on the opposite side of the member 61 from the fluid passageway 64.

Thus when fluid is admitted to the inside of the casing 47 through the passageway 64, fluid under pressure engaging the vane 59 will turn the rotor and the trolley pole 11 in a clockwise direction. When fluid under pressure is admitted to the passageway 65, said rotor and trolley pole will be turned in an opposite direction. Pivotal movement of said trolley pole is limited by means of a stop 66 extending outwardly from said support member 19 and downwardly along the outside of the socket 20 for a short distance, and adapted to engage opposite ends of a quadrant 67 extending from the side of said socket adjacent the locomotive frame (see Figure 3).

Referring now to Figure 8 and the fluid system for supplying fluid under pressure to the cylinder 33, to positively lower the trolley pole 11, and for supplying fluid under pressure to the rotor 46 to positively turn said trolley pole to position it so the trolley wheel 12 may be replaced on the trolley wire, a fluid pump 69 is connected with a fluid storage tank 70 to supply fluid under pressure to the fluid system. Fluid under pressure leaves said pump through a pressure line 71 having a check valve 72 therein. Said pressure line is connected with a pressure responsive switch 73 of a well known form, which may be connected with the electrical circuit for controlling operation of the motor for driving the pump 69, to stop said pump when pressure in the line 71 exceeds a predetermined value. Said pressure responsive switch and the electric circuit to the drive motor for said pump are no part of my present invention, so are not herein shown or described in detail. A pressure line 74 connects the pressure line 71 with an accumulator 75 which accumulates fluid under pressure and supplies fluid under pressure to the fluid system when the pump 69 is shut off, as in cases where the trolley pole is disconnected from the trolley wire. Said pressure line 74 is also connected with the valve 45, which is provided to control the supply of fluid under pressure to the inside of the cylinder 33, to move said cylinder along the piston 34. Said valve may be of a well known form of spool valve and is connected with the inside of the cylinder 33 by means of the fluid passageway 44. A return passageway 76 connected with a pipe 77 connects said valve with the tank 70, to return fluid from the inside of said cylinder to said tank, when the spool of said valve is in the position shown in Figure 8. When the spool of said valve is moved to a position to close the return passageway 76, fluid will pass from the pressure line 74 through the hollow chamber of said valve and out through the passageway 44, to move the cylinder 33 upwardly along the piston 34.

The pipe 74 is also connected with the chamber of a control valve 79 by means of a passageway 80. Said valve may be a well known form of 4-way spool type valve and is provided with a passageway 81 therein connected with the passageway 64, to supply fluid under pressure to the vane 59 of the rotor 46, to turn said rotor in a clockwise direction when the spool of said valve is in the position shown in Figure 8. A passageway 82 leads from said valve and is connected with the passageway 65 to supply fluid under pressure to the opposite side of said vane of said rotor, to turn said rotor in a counter-clockwise direction. A return passageway 83 leads from opposite sides of the chamber of said valve, and is connected with a pipe 84, connected with the return pipe 77, to return fluid from either side of said rotor to the fluid storage tank 70 when pressure is applied to the opposite side of said rotor.

It may be seen from the foregoing that a new and improved mounting for a trolley pole has been provided, so arranged that the trolley wheel is engaged with the trolley wire by means of a spring, and that when the trolley wheel jumps the wire it may be instantaneously lowered under the control of the operator of the locomotive, by operation of the valve 45, and thus prevent breakage of the trolley pole by striking the mine roof and its cross supporting timbers.

It may further be seen that the trolley pole is free to turn about a vertical axis, so it may follow the trolley wire, and that it may be turned by power about said vertical axis by operation of the valve 79, to properly locate the trolley wheel so it may be placed on the wire, by relieving fluid pressure from the cylinder 33, to permit the spring 23 to elevate the trolley wheel into engagement with the wire.

It should here be understood that the speed of raising movement of said trolley wheel and pole may be controlled by the rate of release of fluid from the cylinder 33, and that by manipulation of the valve 45 the speed of upward movement of said trolley pole can be controlled until the wheel has been replaced on the trolley wire, and that the trolley pole can be held in any desired position by the holding of fluid under pressure within the cylinder 33.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claim.

I claim as my invention:

In a trolley pole, a pole having a current collector on its outer end adapted to engage a trolley wire and collect current therefrom, a socket, a support member mounted within said socket for pivotal movement with respect thereto about a vertical axis, a transverse pivotal connection between said pole and said support member, a rod connected with said pole adjacent one of its ends, a spring urging said rod in a direction to move said pole into an upright position and to hold said current collector in engagement with a trolley wire, and power means for turning said support member within said socket to laterally move said trolley pole into position where said current collector may engage the trolley wire upon the raising of said trolley pole including a casing secured to the underside of said socket, a fluid rotor rotatably mounted within said casing, said casing having an inner cylindrical wall spaced from the outer periphery of said rotor, a member extending from said wall to said rotor and forming a barrier between said wall and said rotor, a vane on said rotor slidably engaging said wall and forming a movable barrier between said rotor and wall, and fluid passageways on each side of said member to permit the admission of fluid under pressure to either side of said rotor to cause fluid engaging one side or the other of said vane to turn said rotor in one direction or another, and an operative connection between said rotor and said support member, to laterally move said trolley pole upon pivotal movement of said rotor.

JOSEPH J. SLOMER.

REFERENCES CITED

The following references are of record in the file of this patent:

UNITED STATES PATENTS

| Number | Name | Date |
| --- | --- | --- |
| 558,868 | Wellman | Apr. 21, 1896 |
| 558,870 | Wellman | Apr. 21, 1896 |
| 820,584 | Mackin | May 15, 1906 |
| 868,889 | Rogers | Oct. 22, 1907 |
| 1,035,249 | Sessions | Aug. 13, 1912 |
| 1,175,305 | Schaake | Mar. 14, 1916 |
| 1,487,311 | Bower | Mar. 18, 1924 |
| 1,658,703 | Bower | Feb. 7, 1928 |
| 1,747,489 | Schaake | Feb. 18, 1930 |
| 1,796,211 | Moore et al. | Mar. 10, 1931 |
| 2,304,762 | Larsson | Dec. 8, 1942 |